C. PAULI.
CHUCK.
APPLICATION FILED NOV. 4, 1916.

1,222,320.

Patented Apr. 10, 1917.
2 SHEETS—SHEET 1.

Witnesses:
Chas. E. Whiteman
H. D. Penney

Inventor:
Carl Pauli.
By his Atty, P. H. Richards

C. PAULI.
CHUCK.
APPLICATION FILED NOV. 4, 1916.

1,222,320.

Patented Apr. 10, 1917.
2 SHEETS—SHEET 2.

Witnesses:
Chas. E. Whiteman
H. D. Penney

Inventor:
Carl Pauli.
By his Atty, F. H. Richard

UNITED STATES PATENT OFFICE.

CARL PAULI, OF SOUND BEACH, CONNECTICUT, ASSIGNOR TO GARWOOD COMPANY, OF GARWOOD, NEW JERSEY, A CORPORATION OF NEW JERSEY.

CHUCK.

1,222,320.           Specification of Letters Patent.         Patented Apr. 10, 1917.

Application filed November 4, 1916. Serial No. 129,408.

*To all whom it may concern:*

Be it known that I, CARL PAULI, a citizen of the United States, residing in Sound Beach, in the county of Fairfield and State of Connecticut, have invented certain new and useful Improvements in Chucks, of which the following is a specification.

This invention relates to chucks in general, and more particularly to drill-holding chucks for reciprocating drill, or percussion tools.

One of the main objects of the present invention is to provide a chuck that is composed of the smallest number of parts, that can be manipulated with great facility, thereby permitting the instantaneous introduction of a tool therein, and its quick removal, and that has a minimum of working parts.

These and other features, capabilities and advantages of the invention will appear from the subjoined detail description of one specific embodiment thereof illustrated in the accompanying drawings, in which—

Figure 1:
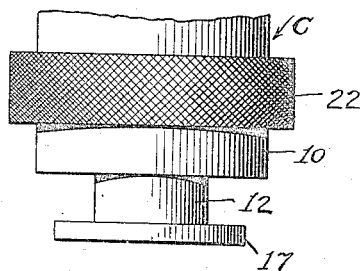
Figure 1 is an elevational, fragmental view of a drill-machine casing, equipped with the present invention.
Figure 6:
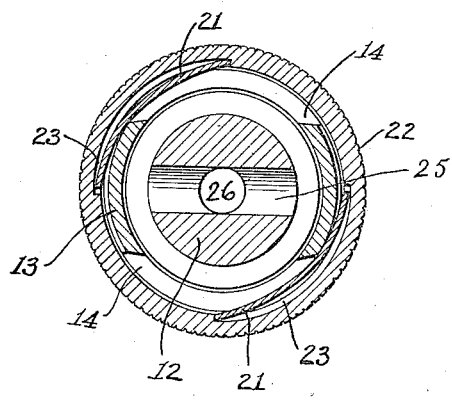
Fig. 6 is a transverse section similar to Figs. 3 and 5, showing the chuck about to be released.
Figure 7:
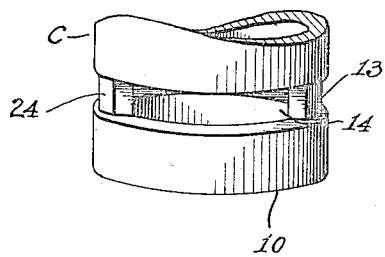
Fig. 7 is a fragmental perspective view showing the part of the casing coöperating with the chuck securing means.
Figure 8:
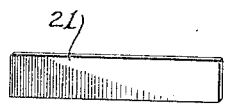
Fig. 8 is a perspective of one of the springs for securing the chuck in place.
Figure 3:
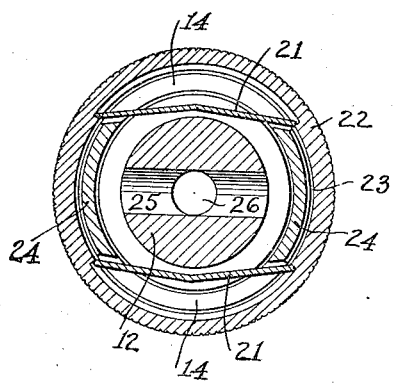
Fig. 3 is a transverse section on the line 3—3 of Fig. 2.

In the embodiment illustrated there is shown the lower tubular end 10 of a drill actuating casing, C, which is provided with the partition 11 to space the chuck 12 from the drill actuating chamber of the casing, and an annular recess 13 adjacent its free end. The tubular end 10 is provided with two oppositely disposed openings 14, clearly shown in Figs. 6 and 7, and which openings are cut out of the walls of the part C.

The chuck 12, is provided with the usual taper socket 15 to receive therein the shank of the drill D, said shank being usually tapered in ordinary practice. The chuck 12 is also provided with two collars 18 and 19, the upper collar 19 being tapered for a purpose to be hereinafter described. The lowermost part of the chuck is also provided with a collar 17 for the purpose of supporting a wrench which may be applied to the cylindrical portion 15, whereby the said drill-holding chuck may be rotated or oscillated by said wrench during the operation of the machine. However, the collar 17 does not form any operative portion of the chuck and in reality forms no part of the present invention. The annular space 20, formed between the collars 18 and 19 is so arranged as to receive therein the chuck-retaining springs 21, whereby to retain the chuck 12 in operative position.

When the chuck is disposed in said operative position, the annular chamber 20 will be in alinement with the recess 13 and its openings 14 to permit the coöperation therewith of the flat springs 21, two being provided in the present instance. For manipulating the springs 21, the ring 22 is provided which is knurled on its outer periphery to facilitate its manipulation, and is provided with two oppositely disposed recesses 23, see Fig. 6, which are slightly greater in length than the length of a spring 21. The springs 21 are disposed in said recesses 23, and when the ring 22 is placed in position on the tubular end 10, the recesses 23 will be in alinement with recess 13, and the springs 21 protrude into the recess 13 thereby locking the ring 22 in operative horizontal position, with freedom for rotative movement.

When the chuck 12 is to be positioned, it is only necessary to force it upwardly into the lower open tubular end 10 of the casing C, and the tapered collar 19, upon coming into contact with the two springs 21, which may be in normal operative position, said springs will be forced apart until they have passed over the collar 19 when they will then snap into the annular recesses 20 formed between collars 18 and 19, and thereby lock the chuck in the normal operative position.

Figure 5:
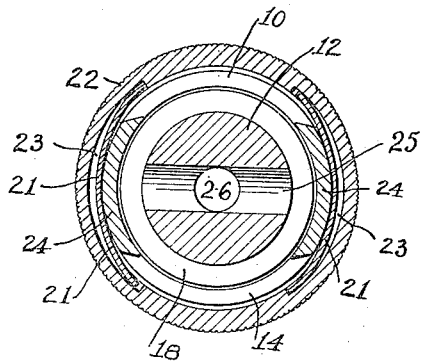
Fig. 5 is a transverse section on the line 5—5 of Fig. 4.
Figure 2:
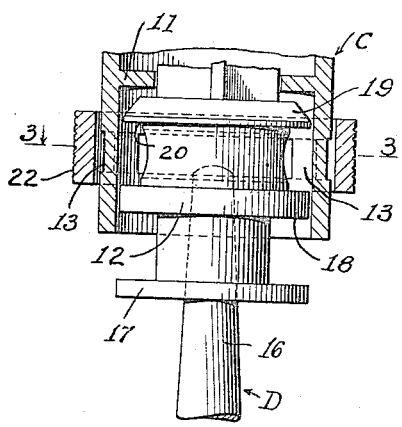
Fig. 2 is a similar view partly in section with the chuck locked in position.

When the chuck 12 is to be moved from the tubular end 10, the ring 22 is so turned that the springs 21, as shown in Fig. 5, are removed from the openings and strained against the connecting portions 24 of the tubular end 10, thereby straining the springs 21, out of the annular chamber 20, as shown in Fig. 5, and permitting the withdrawal of the chuck. As soon as the chuck is removed, the ring 22 may be returned to its normal operative or chuck holding position so that it permits its springs 21 to snap into the openings 14, as shown in Fig. 5. In such position the springs 21 are ready to securely reëngage the chuck in position, as previously described.

Figure 4:
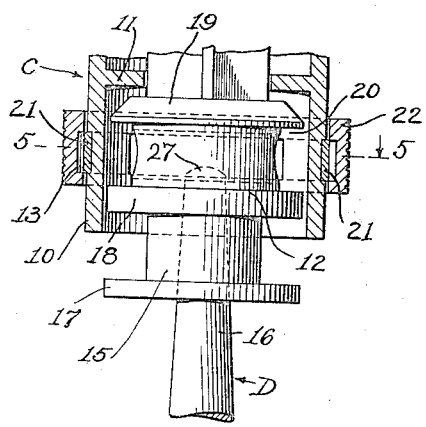
Fig. 4 is a view similar to Fig. 2, showing the chuck released but ready to be secured in place.

The chuck 12, is provided with a transverse release-bore 25, (usually cylindrical) cutting the top of the drill-shank bore 26, on a line so low that the upper rounded end 27, (shown in dotted lines in Fig. 4) of the drill-shank, when in position in the chuck, will project slightly into such release-bore, whereby upon the insertion of a tapered mandrel the drill may be forced out of the drill-shank bore.

It is obvious that various changes and modifications may be made in the details of construction without departing from the general spirit of the invention.

I claim:—

1. The combination with the lower tubular end of a drill actuator casing, of a chuck having an annular recess; and substantially flat springs protruding through said tubular end to engage the annular recess of said chuck to secure said chuck in place.

2. The combination with the lower tubular end of a drill actuator casing, of a chuck having an annular recess; substantially flat springs protruding through said tubular end to engage the annular recess of said chuck to secure said chuck in place; and means for actuating said springs to bring them either into or out of engagement with said recess.

3. The combination with a casing, of a chuck extending into said casing; substantially flat springs anchored to said casing; and means for actuating said springs into and out of chuck-locking position.

4. The combination with a casing, of a chuck extending into said casing, there being openings in said casing; a substantially flat spring anchored at the ends in said casing; and means for actuating the central portions of said flat spring into and out of registry with the casing-openings to lock or release the chuck.

5. The combination with a casing, of a chuck extending into said casing, there being openings in said casing, and there being an annular recess in said chuck registering with said openings when the chuck is in place in the casing; a plurality of substantially flat springs anchored at the ends in said casing; and means for actuating the central portions of said springs into and out of registry with the casing openings, to lock or release the chuck.

6. The combination with a casing, of a chuck extending into said casing, there being openings in said casing, there being an annular recess in said chuck registering with said openings when the chuck extends into said casing, springs anchored to said casing, and a ring for actuating said springs into and out of registry with the casing openings to lock or release the chuck.

7. The combination with a casing, of a chuck extending into said casing, there being openings in said casing, and there being an annular recess in said chuck registering with said openings when the chuck is in place in the casing; springs anchored to said casing; a ring for actuating said springs into and out of registry with the openings of said casing and with the recess of said chuck, to lock and release said chuck in place; there being recesses in the outer periphery of said casing forming with the openings of said casing a continuous annular passage around said casing, and there being oppositely curved recesses in said ring disposed to aline with the annular passage of said casing, the springs being disposed in said curved recesses and extending into the annular passage whereby the same are anchored to said casing.

8. The combination with a casing, of a chuck extending into said casing, there being openings in said casing, an annular recess in said chuck registering with said openings when the chuck is in position in the casing, and there being recesses in the outer periphery of said casing forming with the openings of said casing a continuous annular passage around said casing; a ring movably mounted on the casing having oppositely disposed recesses in its inner wall positioned to aline with the annular passage of said casing; flat springs in the recesses of said ring and extending into the annular passage of the casing whereby the same are anchored to said casing, the vibratory movement of the ring on the casing bringing said flat springs into and out of registry with the casing openings, and the springs when not positioned to extend through said casing openings being flexed between the recesses of the casing and the recesses of the ring.

9. The combination with a casing, of a chuck adapted to be positioned in the casing, there being openings in the casing, an annular recess in said chuck registering with said openings when the chuck extends into said casing, and recesses in the outer peripheral wall of the casing forming with the openings thereof a continuous annular passage around the casing; a ring, having oppositely disposed recesses positioned to aline with the annular passage of the casing, movably mounted on the casing; and means disposed in the recesses of said ring extended into the annular passage of the casing adapted to automatically pass through the openings of said casing into the annular recess of said chuck when in registry with such casing openings to lock said chuck in position.

10. The combination with a drill actuator casing having peripheral openings of a chuck adapted to be positioned in the casing, flat springs anchored to the casing; and means carried by the chuck for actuating the flat springs so as to expand the same thereby to admit said chuck there-between into the casing.

CARL PAULI.

Witnesses:
E. VOETTER,
J. PAULI.

Copies of this patent may be obtained for five cents each, by addressing the "Commissioner of Patents, Washington, D. C."